United States Patent [19]
Kohta et al.

[11] Patent Number: 5,991,080
[45] Date of Patent: Nov. 23, 1999

[54] LIGHT REFLECTING MATERIAL

[75] Inventors: Syuji Kohta, Kuwana; Yasunori Sugiyama, Yono, both of Japan

[73] Assignee: Kimoto Co., Ltd., Japan

[21] Appl. No.: 08/815,120

[22] Filed: Mar. 11, 1997

[30] Foreign Application Priority Data

Mar. 14, 1996 [JP] Japan ................................ 8-085930

[51] Int. Cl.$^6$ .................................................. G02B 5/08
[52] U.S. Cl. .......................... 359/584; 359/589; 359/883
[58] Field of Search .................................. 359/584, 883, 359/884, 871, 589

[56] References Cited

U.S. PATENT DOCUMENTS

| | | |
|---|---|---|
| 4,658,141 | 4/1987 | Wilt et al. . |
| 5,019,347 | 5/1991 | Hiratsuka et al. . |
| 5,316,888 | 5/1994 | Naruse et al. . |
| 5,361,678 | 11/1994 | Roopchand et al. . |
| 5,519,542 | 5/1996 | Yano et al. . |
| 5,627,432 | 5/1997 | Balazs et al. . |
| 5,635,284 | 6/1997 | Metzger et al. . |

FOREIGN PATENT DOCUMENTS

| | | |
|---|---|---|
| 62-286019 | 6/1986 | Japan . |
| 632002 | 6/1986 | Japan . |
| 61-162567 | 7/1986 | Japan . |
| 3256090 | 3/1990 | Japan . |
| 667174 | 8/1992 | Japan . |
| 6-212039 | 8/1994 | Japan . |
| 6-298957 | 10/1994 | Japan . |
| 7-241520 | 9/1995 | Japan . |
| 8-160208 | 6/1996 | Japan . |

*Primary Examiner*—Ricky D. Shafer
*Attorney, Agent, or Firm*—Lorusso & Loud

[57] ABSTRACT

A light reflecting material having a reflecting layer comprising barium sulfate, titanium dioxide and a binder resin. When the light reflecting material of the present invention is used as a reflector of a lighting panel of edge light type, it efficiently causes light to enter into a light conducting plate and hence high brightness of the lighting panel can be obtained. High brightness is also obtained when it is used as a light reflecting material of backlight systems and illumination signboards.

18 Claims, 5 Drawing Sheets

LIGHT REFLECTING MATERIAL

BACKGROUND OF THE INVENTION

1. Field of the Invention

The present invention relates to a light reflecting material for reflectors or reflection plate materials used for back light systems of various visual display units such as liquid crystal displays, illumination signboards, lighting equipment and the like.

In particular, the present invention relates to a light reflecting material of high reflectance useful as a reflector of so-called edge light type lighting panels, which comprise a light conducting plate and a light source arranged facing at least one side edge of the light conducting plate with the reflector being provided around the light source so as to surround the light source and efficiently cause light from the light source to enter the light conducting plate, or as a light reflecting material efficiently reflecting light from the light conducting plate to a liquid crystal panel.

2. Related Art

As conventional light reflecting materials, there can be mentioned aluminum plates such as those described in Japanese Unexamined Application Publication No. Sho 62-286019, metallic reflection plates such as those described in Japanese Utility Model Unexamined Application Publication No. Hei 4-22755, aluminum plates painted white such as those described in Japanese Unexamined Application Publication No. Sho 63-2002, films painted white such as those described in Japanese Unexamined Application Publication No. Hei 6-67174, foamed white films such as those described in Japanese Unexamined Application Publication No. Hei 3-256090 and the like.

In particular, backlights of the edge light type now in wide use often use silver deposited films of high reflectance as a reflector to obtain high brightness in lighting panels.

As a light source for backlights of the edge light type, tubular lamps including hot-cathode tubes and cold-cathode tubes are generally used. However, problems may arise when a silver deposited film is used as the reflector of these lamps. For example, oscillation of the light source and lighting failure may occur because conductive silver is present very close to the light source. Furthermore, silver deposited films are very expensive.

On the other hand, lighting failure could be obviated by using a foamed white film for the reflector. As disclosed in Japanese Unexamined Application Publication No. Hei 3-256090, however, the flexibility required for good handling during wrapping about the light source can be ensured only up to a maximum thickness of about 75 $\mu$m when the foamed white film is a foamed white polyester film.

However, if such a thin foamed white film is used as the reflector, it may disadvantageously leak light from the light source to the outside and hence lower the brightness of the lighting panel.

In the case of aluminum plates and films painted white, good hiding property can be obtained if titanium dioxide is used as a white pigment. However, titanium dioxide absorbs light of 450 nm and shorter wavelengths and the light reflectance is therefore disadvantageously suppressed below a certain level.

Further, if barium sulfate is used as a white pigment, the layer containing the barium sulfate must have a large thickness or contain a large amount of added barium sulfate to obtain high reflectance because barium sulfate has low hiding power. If the thickness of the layer containing barium sulfate is increased to obtain sufficient hiding power, it becomes difficult to wrap the film around the lamp and hence the efficiency of the operation is degraded. If thickness of the layer is made smaller to obtain sufficient flexibility, the quantity of barium sulfate added has to be increased beyond the critical pigment concentration in order to obtain sufficient hiding power and the coated layer is therefore liable to suffer cohesive failure.

The object of the present invention is to solve the problems of the conventional materials mentioned above, i.e., to provide a light reflecting material which is free from the problems of oscillation of light source, lighting failure and the like, exhibits high reflectance, and has sufficient flexibility enabling easy wrapping around a light source.

SUMMARY OF THE INVENTION

As a result of our research directed to solving the above problems, it was found that combination of barium sulfate and titanium dioxide can provide high reflectance compared with that obtainable when each is used alone in the same amount and, therefore, provide a light reflecting material which exhibits high reflectance and sufficient flexibility.

Accordingly, the present invention provides a light reflecting material having a reflecting layer comprising barium sulfate, titanium dioxide and a binder resin.

The reflecting layer of the light reflecting material of the present invention may be one consisting of at least one layer containing both barium sulfate and titanium dioxide, or one consisting of at least two layers one of which contains titanium dioxide and the other of which contains barium sulfate. In the latter case, the layer containing barium sulfate is positioned on the reflecting surface side.

Therefore, according to an embodiment of the light reflecting material of the present invention, there is provided a light reflecting material which has a reflecting layer consisting of at least one layer containing barium sulfate and titanium dioxide (the first embodiment).

Further, according to another embodiment of the light reflecting material of the present invention, there is provided a light reflecting material which has a reflecting layer consisting of at least two layers one of which contains barium sulfate and the other of which contains titanium dioxide with the layer containing barium sulfate being positioned on the reflection surface side(the second embodiment).

In the light reflecting material of the present invention, the weight ratio of barium sulfate and titanium dioxide contained in the reflecting layer is preferably 9:1 to 4:6.

The thickness of the reflecting layer of the light reflecting material according to the first embodiment of the present invention is preferably 5 $\mu$m to 210 $\mu$m, more preferably 15 $\mu$m to 210 $\mu$m.

In the light reflecting material according to the second embodiment of the present invention, the layer containing barium sulfate preferably has a thickness of 10 $\mu$m or more, more preferably 50 $\mu$m or more, and the layer containing titanium dioxide preferably has a thickness of 5 $\mu$m or more, more preferably 10 $\mu$m or more. The total thickness of the two layers is preferably 300 $\mu$m or less, more preferably 210 $\mu$m or less.

In the light reflecting material of the present invention having a reflecting layer comprising barium sulfate and titanium dioxide, light is reflected by both the barium sulfate and the titanium dioxide and a given reflectance is obtained with a smaller amount of the pigments than when each pigment is used alone. Therefore, the reflecting layer can be made thinner and there can be provided a light reflecting material exhibiting both excellent flexibility and excellent light reflectance. Further, according to the second embodiment of the present invention, the layer containing titanium dioxide is not present at the top of the reflecting surface and therefore the light reflecting material of the present invention is free from the problem of decreased reflectance of short wavelength domain due to absorption of light of 450 nm and shorter wavelengths by titanium dioxide.

DETAILED DESCRIPTION OF THE INVENTION

The light reflecting material according to the first embodiment of the present invention has a reflecting layer consisting of at least one layer containing both barium sulfate and titanium dioxide. The reflecting layer is usually provided on a support and can be provided one or both surfaces of the support.

Figure 1:
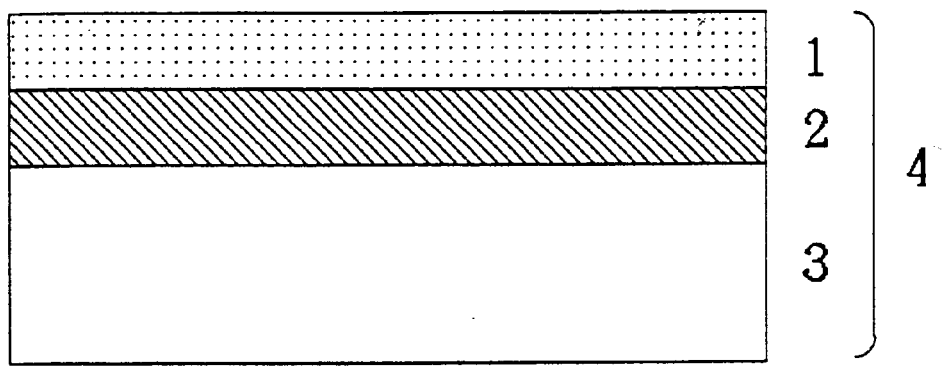
FIG. 1 is a cross-sectional view of an example of a light reflecting material of the present invention.
Figure 2:
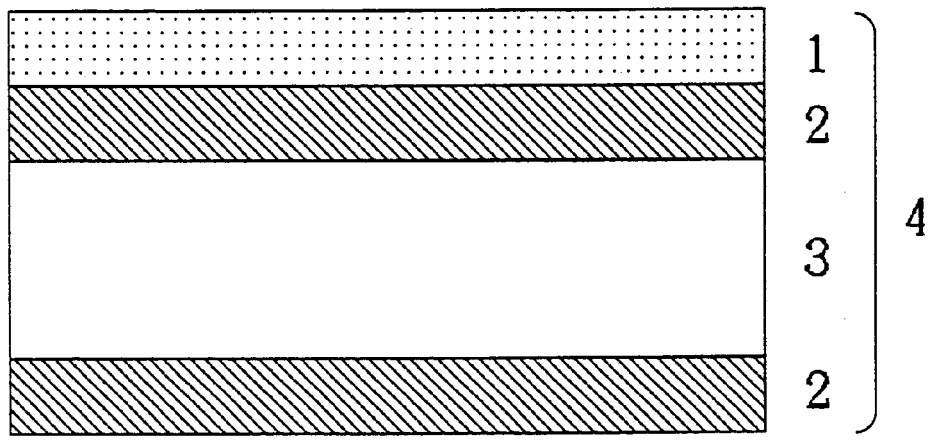
FIG. 2 is a cross-sectional view of another example of a light reflecting material of the present invention.
Figure 3:
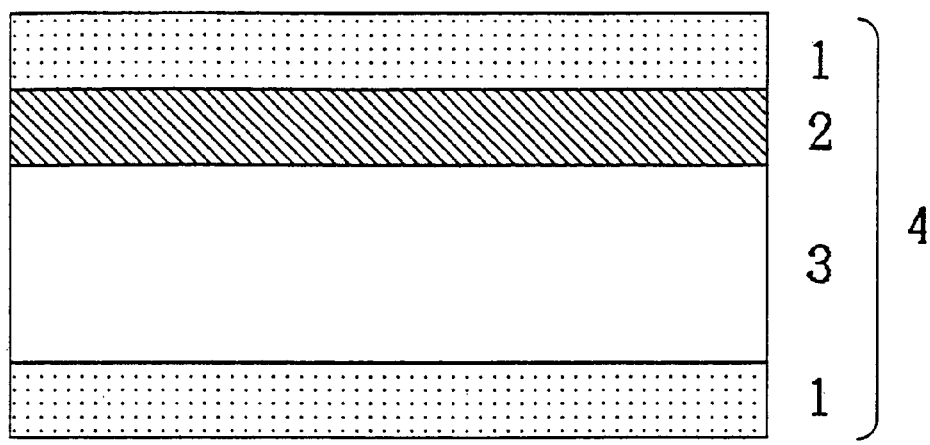
FIG. 3 is a cross-sectional view of another example of a light reflecting material of the present invention.
Figure 4:
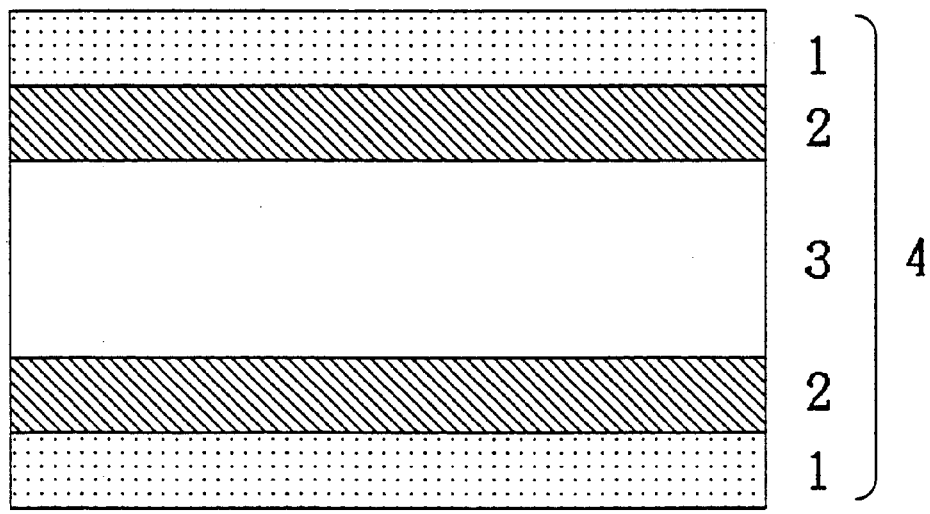
FIG. 4 is a cross-sectional view of another example of a light reflecting material of the present invention.

The light reflecting material according to the second embodiment of the present invention has a reflecting layer consisting at least two layers one of which contains barium sulfate and the other of which contains titanium dioxide. The layer containing barium sulfate is positioned on the reflection surface side. These layers can be provided on one surface of a support, and another layer or layers may be provided on the other surface of the support opposite to the one provided with the two layers containing barium sulfate and titanium dioxide. For example, the light reflecting material 4 may have a structure where, as shown in FIG. 1, a layer containing titanium dioxide (titanium dioxide layer) 2 and a layer containing barium sulfate (barium sulfate layer) 1 are provided in this order on a support 3 composed of, for example, a transparent plastic or white plastic film, a structure where, as shown in FIGS. 2 to 4, a titanium dioxide layer 2 and a barium sulfate layer 1 are provided in this order on one surface of a support 3 and another titanium dioxide layer 2 and/or another barium sulfate layer 1 are further provided on the other surface of the support 3, or the like.

Figure 5:
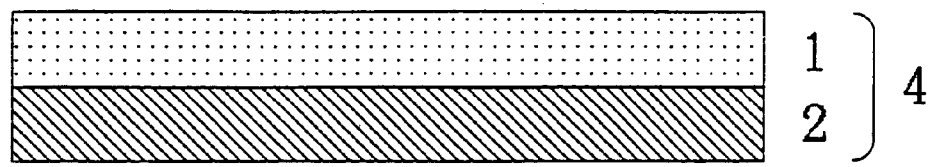
FIG. 5 is a cross-sectional view of another example of a light reflecting material of the present invention.
Figure 6:
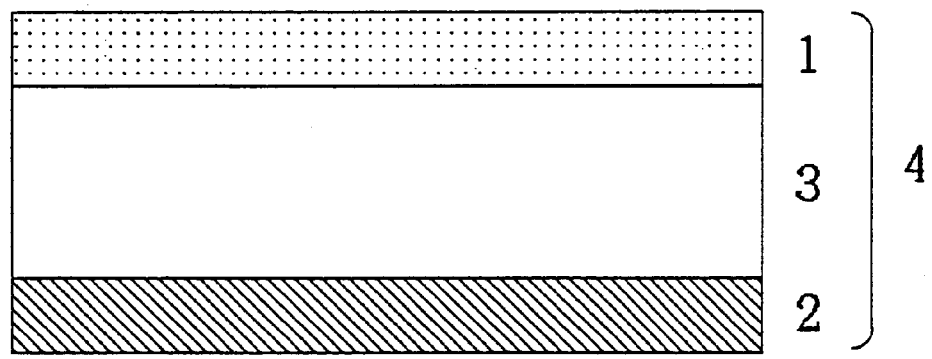
FIG. 6 is a cross-sectional view of another example of a light reflecting material of the present invention.

The light reflecting material according to the second embodiment of the present invention may consist solely of the barium sulfate layer and the titanium dioxide layer, without the support (FIG. 5). Furthermore, in the light reflecting material according to the second embodiment of the present invention, the barium sulfate layer and titanium dioxide layer do not need to be arranged immediately adjacent to each other. For example, the light reflecting material 4 may have a structure where the titanium dioxide layer 2 is provided on one side of support 3 and the barium sulfate layer 1 is provided on the other side of the support 3 (FIG. 6).

In the light reflecting material according to the second embodiment of the present invention, the barium sulfate layer 1 is always positioned on the reflecting surface side with respect to the titanium dioxide layer as shown in the above specific examples.

Each of the layers constituting the light reflecting material of the present invention will be further detailed hereinafter.

The support used for the light reflecting material of the present invention is preferably, but not limited to, a transparent or white film composed of polyethylene, polyethylene terephthalate, polypropylene, polyvinyl chloride, polycarbonate, acrylic resin or the like. The thickness of the support is not particularly limited, but it is usually in the range of 25 to 125 $\mu$m.

Among the supports mentioned above, a white plastic film, for example, a foamed white polyester film is particularly preferred, because it can provide particularly high reflectance and has flexibility.

An anchor overcoat may be provided on the support in order to improve adhesion with a layer to be laminated thereon.

The reflecting layer of the light reflecting material of the present invention consists of a binder resin and white pigments (barium sulfate and titanium dioxide).

Binder resins usable for the reflecting layer of the light reflecting material of the present invention include synthetic resins such as urethane resins, acrylic resins, epoxy resins, vinyl resins, polyester resins, polyamide resins and rubbers. In order to impart high flexibility to the reflecting layer, it is particularly preferred to select a binder resin exhibiting a Shore hardness according to JIS-Z2246 of 20 or less.

Figure 7:
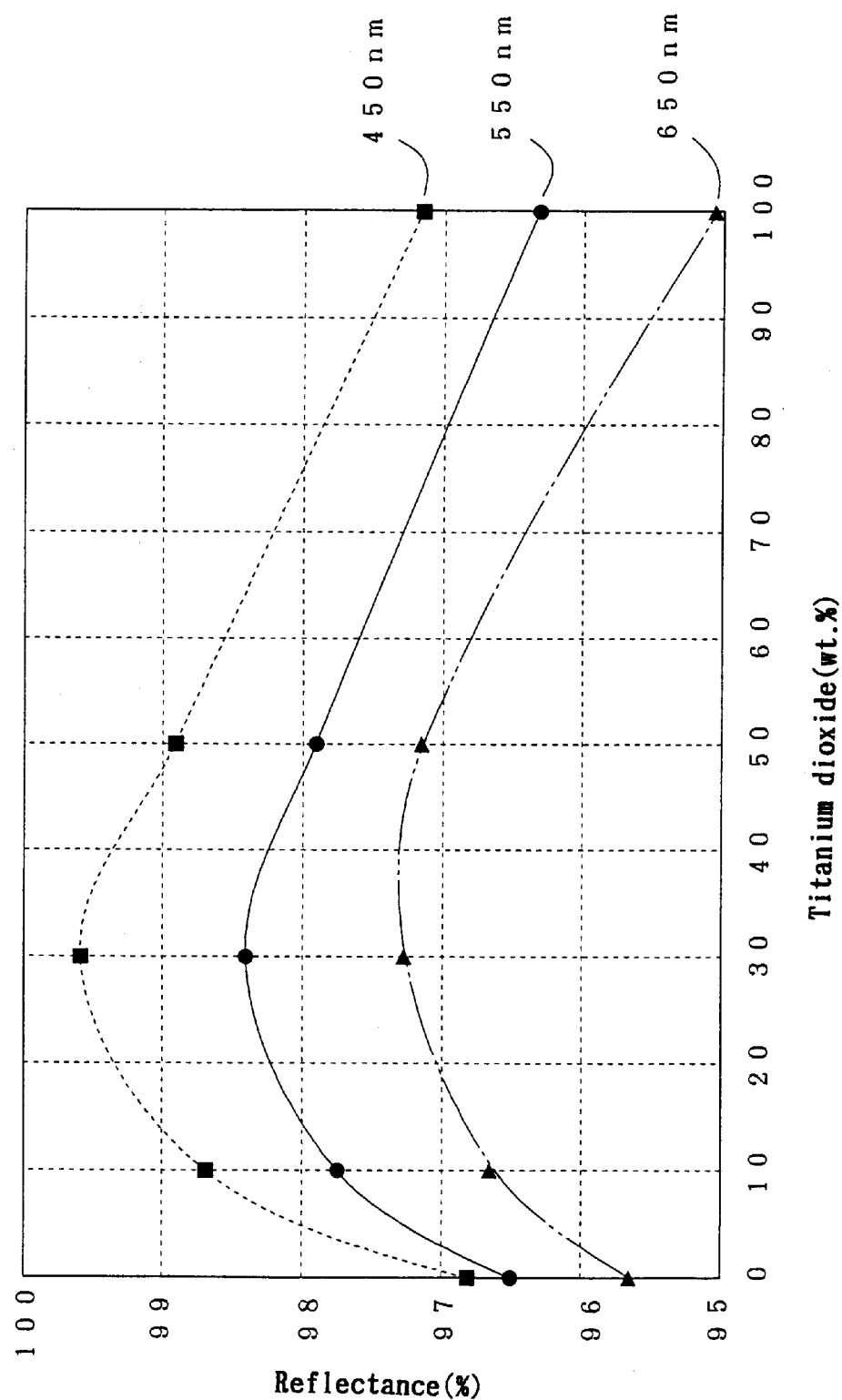
FIG. 7 is a graph showing how reflectance varies with ratio of barium sulfate:titanium dioxide.

The white pigment contained in the reflecting layer of the light reflecting material of the first embodiment of the invention is a mixture of barium sulfate and titanium dioxide. Even though a very small amount of titanium dioxide exerts a reflectance improving effect as shown in FIG. 7, the increase in reflectance is pronounced in a weight ratio of barium sulfate:titanium dioxide in a range of 9.5:0.5 to 2:8. The increase of reflectance is particularly great in the mixing ratio range of 9:1 to 4:6.

The ratio of barium sulfate and titanium dioxide to the binder resin should be less than a critical pigment concentration and 200 to 1000 parts by weight of the pigment are ordinarily used per 100 parts by weight of the binder resin. When the amount of the binder resin is more than 1000 parts by weight, the coated layer becomes brittle. If the amount of the binder resin is less than 200 parts by weight, the hiding power becomes insufficient.

The barium sulfate and titanium dioxide used in the reflecting layer can have the same particle size as when they are used ordinarily as a pigments, and they usually have a particle size of about 0.01 to 10 $\mu$m.

The thickness of the reflecting layer of the light reflecting material of the first embodiment of the present invention is preferably 210 $\mu$m or less. When the thickness is more than 210 $\mu$m, it becomes difficult to wrap the material around a lamp as a reflector even if a highly flexible resin is selected for the binder resin and hence the efficiency of the operation is degraded. In addition, if the thickness is larger than the above thickness, sufficient hiding power, and hence improved reflectance, can be obtained with barium sulfate alone (see FIG. 8,A). Therefore, it become difficult to recognize a significant difference vis-a-vis use of the combination of barium sulfate and titanium dioxide (see FIG. 8,C), and combined use therefore becomes meaningless.

On the other hand, when the thickness is too small, reflectance becomes too low and the light reflecting material cannot exhibit its function as a light reflecting material even though some reflectance improvement effect can be seen. The thickness should be generally be 5 µm or more, preferably 15 µm or more.

The barium sulfate layer of the reflecting layer of a light reflecting material according to the second embodiment of the present invention consists of barium sulfate and a binder resin. And the titanium dioxide layer consists of titanium dioxide and a binder resin, but it may further contain other known white pigment. In particular, the titanium dioxide layer preferably contains titanium dioxide and barium sulfate.

The of the binder resin and its weight ratio with respect to the pigments used for the barium sulfate layer and the titanium dioxide layer may be similar to those mentioned for the reflecting layer of the first embodiment. The ratio of barium sulfate and titanium dioxide may also be similar to that mentioned for the reflecting layer of the first embodiment in terms of their ratio of total amounts in the barium sulfate layer and titanium dioxide layer.

The barium sulfate layer generally has a thickness of 10 µm or more preferably 50 µm or more. The titanium dioxide layer generally has a thickness of 5 µm or more, preferably 10 µm or more. When the thickness of the barium sulfate layer is less than 10 µm, the reflecting layer cannot efficiently reflect light of 450 nm and shorter wavelengths. When the thickness of the titanium dioxide layer is less than 5 µm, reflectance becomes too low and the light reflecting material cannot function as a light reflecting material. Therefore, the barium sulfate layer and the titanium dioxide layer together preferably have a total thickness of at least about 15 µm.

On the other hand, the upper limit of the thickness is not particularly limited, but the barium sulfate layer and the titanium dioxide layer together preferably have a total thickness of 300 µm or less or, when the light reflecting material is wound around a lamp of a small tubular diameter, 210 µm or less. When it is thicker than 210 µm, it becomes difficult to wrap it around a lamp of a small tubular diameter even if a resin capable of imparting flexibility to the coated layer is used.

In the light reflecting material according to the second embodiment of the present invention, of the at least two layers constituting the reflecting layer, the barium sulfate layer is positioned on the reflecting side. However, a protective layer can be provided on the surface of the barium sulfate layer so long as it does not degrade the performance of the material as a light reflecting material.

The reflecting layer of the light reflecting material of the present invention may contain various additives such as dispersant, leveling agent, anti-aging agent, plasticizer, antistatic agent and fluorescent whitening agent so long as they do not degrade the functions required for the light reflecting material of the present invention.

Various known methods can be used for providing the reflecting layer described above on a support. For example, application methods such as the bar coating method, roll coating method, spray coating method and dip coating method, entire surface printing methods such as silkscreen printing, offset printing and gravure printing, and molding methods such as extrusion molding method can be used.

As mentioned earlier, the light reflecting material according to the second embodiment of the present invention may consist solely of the barium sulfate layer and the titanium dioxide layer (FIG. 5). A light reflecting material of this structure can be produced by, for example, laminating the titanium dioxide layer and the barium sulfate layer successively on a support having releasability, then peeling and removing the support. Such a support having releasability can be produced by subjecting a support of any known material mentioned above to a known releasability imparting treatment. The light reflecting material of this structure not containing a support may have further improved flexibility. Further, such a support can be retained until use so that it can serve as a protective layer during transportation and processing before use.

In the light reflecting material of the invention, by using a combination of barium sulfate and titanium dioxide as white pigment, reflectance higher than that obtainable with the same amount of each pigment alone can be provided. Further, in the second embodiment, reflectance is not degraded due to absorption of light having a wavelength of 450 nm or lower by titanium dioxide. In addition, the light reflecting material according to the second embodiment of the present invention does not contain titanium dioxide in the surface layer and hence it does not abrade the metal surface of an apparatus used for processing the light reflecting material such as a die cutting machine.

When the light reflecting material of the present invention is used as a reflector of a lighting panel of the edge light type, light is efficiently directed into a light conducting plate and hence high brightness of the lighting panel can be obtained. High brightness is also obtained when it was used as a light reflecting material of backlight systems and illumination signboards.

EXAMPLES

The present invention will be further explained with reference to the following examples. However, it is not limited to these examples.

Example 1

Barium sulfate (trade name: B-55, Sakai Chemical Industry Co., Ltd.) and titanium dioxide (trade name: TYPURE R-700, Dupont Inc.) in a weight ratio shown in Table 1 were dispersed in a lacquer type urethane resin (trade name: ADEKABONTYTER U-500, Asahi Denka Kogyo K.K.) in a pigment:resin ratio (weight ratio) of 6:1 to prepare a paint for a reflecting layer. This paint was applied on both surfaces of a foamed white polyester film having a thickness of 75 µm (trade name: LUMIRROR E-60, Toray Industries, Inc.) to obtain a dry thickness of the coated layers of 50 µm. Thus, light reflecting materials according to the first embodiment of the present invention were prepared.

The relative diffuse reflectance of these light reflecting materials was measured by a spectrophotometer UV-3101 (Shimadzu Corporation) at 450, 550 and 650 nm. The results are shown in Table 1.

These light reflecting materials were used as reflectors of backlight systems of the edge light type, and average brightness was measured using a BM-7 luminance meter (Topcon Corporation). The results are shown in Table 1.

The relation between the weight ratio of barium sulfate:titanium dioxide and reflectance is shown in FIG. 7.

Elements of the backlight system used for the measurement Lamp: 2.6 φ, tube surface brightness of 26,000 cd/m²

Light conducting plate: Size of 10 inches, thickness of 3 mm

Reflection plate: REFWHITE 188 (Kimoto Co., Ltd.)

Diffusion plate: LIGHTUP SH (Kimoto Co., Ltd.), 2 pieces

TABLE 1

| Barium sulfate | Titanium dioxide | Reflectance (%) 450 nm | 550 nm | 650 nm | Average brightness (cd/m²) |
|---|---|---|---|---|---|
| 10 | 0 | 96.75 | 96.51 | 95.62 | 512 |
| 9 | 1 | 98.73 | 97.72 | 96.57 | 524 |
| 7 | 3 | 99.57 | 98.38 | 97.30 | 531 |
| 5 | 5 | 98.90 | 97.93 | 97.15 | 521 |
| 0 | 10 | 97.09 | 96.36 | 95.03 | 510 |

Example 2

Light reflecting materials were produced as in Example 1 except that the reflecting layer was provided on one surface of the support, and the reflectance (550 nm) and average brightness were measured similarly.

The results are shown in Table 2.

TABLE 2

| Barium sulfate | Titanium dioxide | Reflectance 550 nm (%) | Average brightness (cd/m²) |
|---|---|---|---|
| 10 | 0 | 95.23 | 478 |
| 9 | 1 | 96.64 | 500 |
| 7 | 3 | 97.29 | 513 |
| 5 | 5 | 97.22 | 506 |
| 0 | 10 | 95.38 | 480 |

Example 3

Barium sulfate (trade name: B-54, Sakai Chemical Industry Co., Ltd.) was dispersed in an acrylic polyol resin (trade name ACRYDIC 49-394IM, Dainippon Ink & Chemicals, Inc.) in a resin:pigment weight ratio of 1:6 to prepare a paint for reflecting layer containing barium sulfate alone (Paint A).

Titanium dioxide (trade name: TYPURE R-700, Dupont Inc.) was dispersed in an acrylic polyol resin (trade name: ACRYDIC 49-394IM, Dainippon Ink & Chemicals, Inc.) in a pigment:resin weight ratio of 6:1 to prepare a paint for a reflecting layer containing titanium dioxide alone (Paint B).

Barium sulfate (trade name: B-54, Sakai Chemical Industry Co., Ltd.) and titanium dioxide (trade name: TYPURE R-700, Dupont Inc.) in a weight ratio of 7:3 were dispersed in an acrylic polyol resin (trade name ACRYDIC 49-394IM, Dainippon Ink & Chemicals, Inc.) in a pigment:resin weight ratio of 6:1 to prepare a paint for a reflecting layer according to the present invention (Paint C).

Each of these Paints A, B and C was applied on one surface of a transparent polyester film having a thickness of 100 μm (trade name: LUMIRROR T-60, Toray Industries, Inc.) to obtain various dry thicknesses shown in Table 3 and prepare light reflecting materials.

The relative diffuse reflectance of the light reflecting materials was measured as in Example 1.

Figure 8:
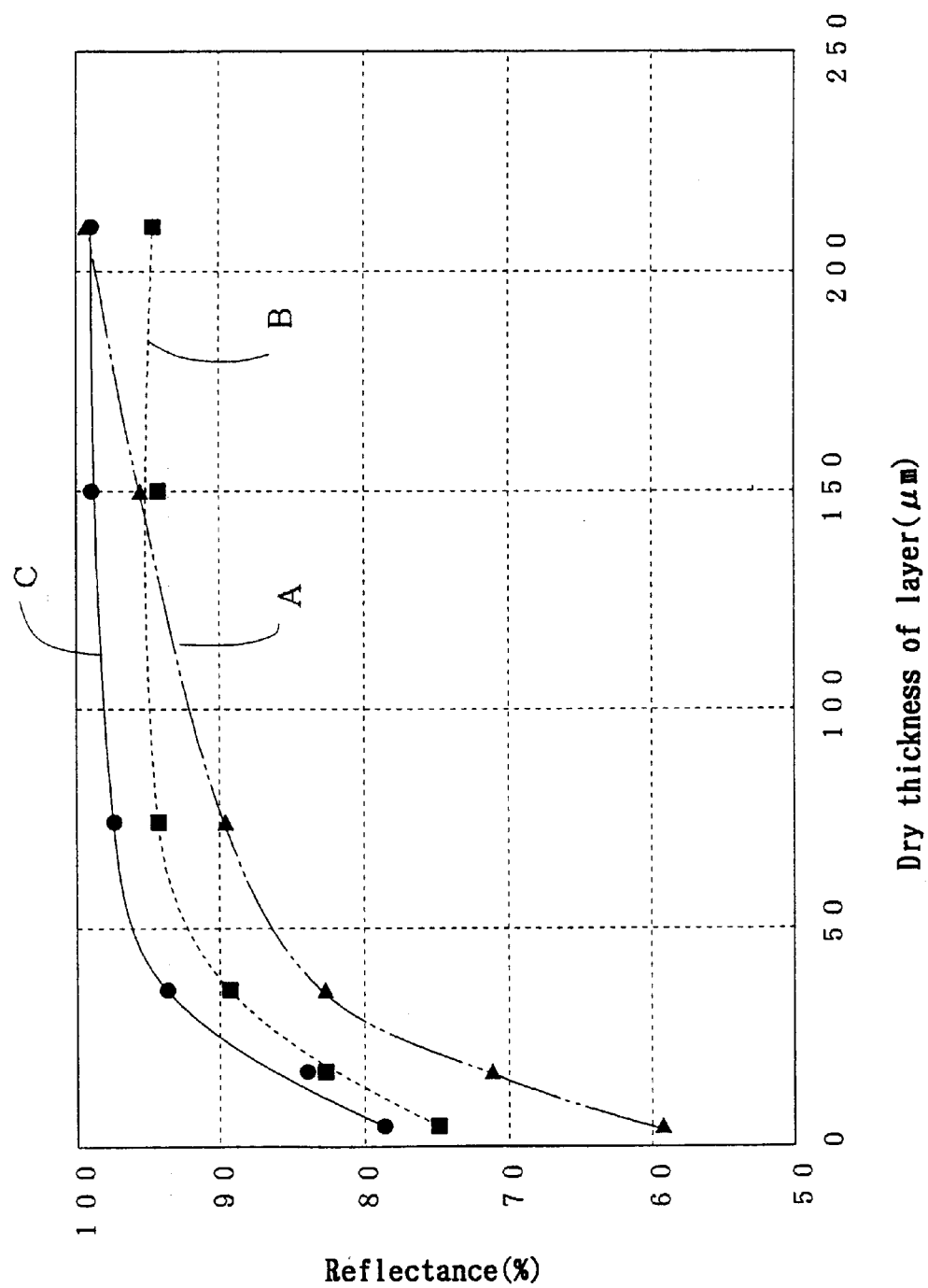
FIG. 8 is a graph showing how reflectance varies with dry thickness of the reflecting layer when barium sulfate and titanium dioxide are used alone and used together.

The results are shown in Table 3 and FIG. 8. The symbols A to C in FIG. 8 correspond to Paints A to C.

TABLE 3

| Dry thickness (μm) | Paint | Reflectance (%) 450 nm | 550 nm | 650 nm |
|---|---|---|---|---|
| 8 | A | 62.25 | 59.15 | 57.09 |
|  | B | 83.37 | 75.03 | 68.82 |
|  | C | 84.10 | 78.68 | 74.13 |
| 17 | A | 74.62 | 71.32 | 69.10 |
|  | B | 89.93 | 82.67 | 76.94 |
|  | C | 89.30 | 83.89 | 79.69 |
| 35 | A | 85.80 | 82.73 | 80.85 |
|  | B | 94.30 | 89.32 | 85.12 |
|  | C | 97.20 | 93.57 | 90.74 |
| 75 | A | 92.40 | 89.79 | 88.75 |
|  | B | 96.62 | 94.31 | 92.06 |
|  | C | 99.85 | 97.72 | 96.30 |
| 105 | A | 96.95 | 95.43 | 94.25 |
|  | B | 96.44 | 94.66 | 92.85 |
|  | C | 99.86 | 99.01 | 98.13 |
| 210 | A | 99.25 | 99.03 | 98.07 |
|  | B | 96.50 | 94.72 | 92.88 |
|  | C | 99.90 | 99.02 | 98.13 |

From these results, it can be seen that, with a thickness of 210 μm or less, higher reflectance can be obtained with a mixed pigment of barium sulfate and titanium dioxide than with those obtained with each of them alone.

Example 4

Light reflecting materials were produced in the same manner as in Example 3 except that titanium dioxide was changed from R-700 to FR-77 (Furukawa Co., Ltd.), and the relative diffuse reflectance was measured.

The results are shown in Table 4.

TABLE 4

| Dry thickness (μm) | Paint | Reflectance (%) 450 nm | 550 nm | 650 nm |
|---|---|---|---|---|
| 8 | A | 62.25 | 59.15 | 57.09 |
|  | B | 83.97 | 76.84 | 70.63 |
|  | C | 84.22 | 77.53 | 73.16 |
| 17 | A | 74.62 | 71.32 | 69.10 |
|  | B | 91.10 | 84.50 | 79.09 |
|  | C | 92.02 | 87.10 | 83.50 |
| 35 | A | 85.80 | 82.73 | 80.85 |
|  | B | 95.48 | 90.32 | 86.40 |
|  | C | 97.12 | 93.53 | 90.77 |
| 75 | A | 92.40 | 89.79 | 88.75 |
|  | B | 96.11 | 92.66 | 89.97 |
|  | C | 99.35 | 97.25 | 95.60 |

Example 5

Preparation of Paint D

Barium sulfate (trade name: B-54, Sakai Chemical Industry company) was dispersed in a urethane polyester polyol resin having a Shore hardness of 5 to 7 (trade name: BARNOCK D6-439, Dainippon Ink & Chemicals Co., Ltd.) in a pigment:resin weight ratio of 6:1 to prepare Paint D.

Preparation of paint E

Titanium dioxide (trade name FR -22, Furukawa Co., Ltd.) was dispersed in a urethane polyester polyol resin having a Shore hardness of 5 to 7 (trade name: BARNOCK D6-439, Dainippon Ink & Chemicals Co., Ltd.) in a pigment:resin weight ratio of 6:1 are Paint E.

Paint D was applied to one surface of a foamed white polyester film having a thickness of 75 μm (trade name: LUMIRROR E60, Industries, Inc.) to obtain a dry thickness of the coated layer of 70 μm and form a barium sulfate layer.

Further, Paint E was applied to the other surface of the support to obtain a dry thickness of the coated layer of 30 μm and form a titanium dioxide layer. Thus, a light reflecting material of the present invention was prepared.

Example 6

Preparation of Paint F

Paint D and Paint E were mixed in a weight ratio of 7:3 to prepare Paint F.

Paint F was applied to a releasable surface of a releasable polyester film having a thickness of 75 μm (trade name: DIAFOIL MRX, Diafoil Hoechst Co., Ltd.) to obtain a dry thickness of the coated layer of 53 μm and form a titanium dioxide layer.

Further, Paint D was painted on the obtained titanium dioxide layer to obtain a dry thickness of the coated layer of 122 μm and form a barium sulfate layer. Thus a light reflecting material of the present invention was prepared.

The relative diffuse reflectance of the light reflecting materials obtained in Examples 5 and 6 were measured by a UV-3101 spectrophotometer (Shimadzu Corporation) at 380, 400, 450 and 550 nm. Measurement with respect to the material of Example 6 was performed after peeling off the support. The results are shown in Table 5.

TABLE 5

|  | Reflectance (%) | | | |
| --- | --- | --- | --- | --- |
|  | 380 nm | 400 nm | 450 nm | 550 nm |
| Example 5 | 88 | 94 | 98 | 98 |
| Example 6 | 88 | 93 | 97 | 97 |

What is claimed is:

1. A flexible light reflecting material comprising a support layer and a reflecting layer formed on the support layer, said reflecting layer comprising barium sulfate, titanium dioxide and a binder resin and said support layer comprising a white plastic film.

2. The light reflecting material of claim 1, wherein the reflecting layer consists of at least one layer containing barium sulfate and titanium dioxide.

3. The light reflecting material of claim 1, wherein weight ratio of barium sulfate and titanium dioxide contained in the reflecting layer is in a range of 9:1 to 4:6.

4. The light reflecting material of claim 1, wherein the binder resin is a resin having a Shore hardness according to JIS-Z2246 of 20 or less.

5. The light reflecting material of claim 1, wherein thickness of the reflecting layer is 5 μm to 210 μm.

6. The light reflecting material of claim 5, wherein thickness of the reflecting layer is 15 μm to 210 μm.

7. The light reflecting material of claim 1 wherein said support layer has a thickness of 25 to 125 μm.

8. A flexible light reflecting material comprising, as a reflecting layer, at least first and second layers wherein said first layer contains barium sulfate and no titanium dioxide and provides a light reflecting surface for the light reflecting material and said second layer contains titanium dioxide.

9. The light reflecting material of claim 8, wherein thickness of the layer containing barium sulfate is 10 μm or more, thickness of the layer containing titanium dioxide is 5 μm or more and these two layers together have a total thickness of 300 μm or less.

10. The light reflecting material of claim 9, wherein thickness of the layer containing barium sulfate is 50 μm or more, thickness of the layer containing titanium dioxide is 10 μm or more and these two layers together have a total thickness of 210 μm or less.

11. The light reflecting material of claim 9 having a maximum thickness of 210 μm.

12. The light reflecting material of claim 8, wherein the layer containing titanium dioxide and the layer containing barium sulfate are laminated on a support in this order.

13. The light reflecting material of claim 8, wherein the layer containing titanium dioxide and the layer containing barium sulfate are provided on one surface of a support and another layer containing titanium dioxide and/or another layer containing barium sulfate are provided on the other surface of the support.

14. The light reflecting material of claim 8, wherein the layer containing titanium dioxide is provided on one surface of a support and the layer containing barium sulfate is provided on the other surface of the support.

15. The light reflecting material of claim 8, wherein the layer containing titanium dioxide further contains barium sulfate.

16. The light reflecting material of claim 8, wherein the weight ratio of barium sulfate and titanium dioxide contained in the reflecting layer is in a range of 9:1 to 4:6.

17. The light reflecting material of claim 8 wherein each of said first and second layers additionally contains a binder resin having a Shore hardness according to JIS-Z2246 of 20 or less.

18. The light reflecting material of claim 8, wherein the thickness of the reflecting layer is 5 μm to 210 μm.

* * * * *